United States Patent [19]

Todd

[11] 3,999,781
[45] Dec. 28, 1976

[54] UNIVERSAL SWIVEL HOSE COUPLING

[76] Inventor: William H. Todd, P.O. Box 49, Winston-Salem, N.C. 27102

[22] Filed: Nov. 29, 1974

[21] Appl. No.: 528,204

Related U.S. Application Data

[63] Continuation-in-part of Ser. No. 356,409, May 2, 1973, Pat. No. 3,863,958.

[52] U.S. Cl. .............................. 285/12; 285/174; 285/256; 285/281; 285/354
[51] Int. Cl.² ....................................... F16L 25/00
[58] Field of Search ........... 285/12, 174, 247, 250, 285/354, 246, DIG. 7, 272, 281, 256, 258, 149, 175, 386, 334.5

[56] References Cited

UNITED STATES PATENTS

| 961,170 | 6/1910 | Shotwell | 285/175 X |
|---|---|---|---|
| 2,300,517 | 11/1942 | Milton | 285/256 X |
| 2,595,900 | 6/1952 | Sous | 285/258 X |
| 2,859,985 | 11/1958 | Smisko | 285/247 |
| 2,863,678 | 12/1958 | Gordon et al. | 285/334.5 X |
| 3,684,319 | 8/1972 | Samortina | 285/247 |
| 3,863,958 | 2/1975 | Todd | 285/12 |

Primary Examiner—Dave W. Arola
Attorney, Agent, or Firm—Bell, Seltzer, Park and Gibson

[57] ABSTRACT

A universal swivel hose coupling which is adapted to be sealably connected to dissimilar externally threaded male fittings. The hose coupling includes a tubular stem having one end adapted to be received into the end of a hose and an opposite end having a forwardly facing frusto-conical surface. A nut is rotatably carried by the stem and includes an entry end portion at the outer end thereof. The frusto-conical portion of the stem is adapted to sealably mate with a male "flare" fitting having a conically tapered forward end conforming to the taper of the frusto-conical portion, and the entry end portion of the nut is adapted to sealably engage the O-ring of a male "straight thread O-ring boss" fitting.

13 Claims, 5 Drawing Figures

UNIVERSAL SWIVEL HOSE COUPLING

The present application is a continuation-in-part of copending application Ser. No. 356,409 filed May 2, 1973, now U.S. Pat. No. 3,863,958.

The present invention relates to a hose coupling adapted to be fixedly connected to one end of a hydraulic hose or the like, and characterized by the ability to swivel, and to sealably receive dissimilar externally threaded male fittings.

In connecting hydraulic and pneumatic hoses to various external components such as valves, pumps, motors and the like, it is conventional practice to initially fixedly attach a hose coupling to one end of the hose. Normally, the fitting of the external component will not be designed to mate directly with the hose coupling, and it is common to attach an "adapter" to the hose coupling for the purpose of converting the fitting of the hose coupling to one which will properly mate with the fitting of the external component. Since there is a large number of standard hose coupling sizes (resulting from the large number of standard hose sizes), and since there is a large number of fitting designs which are used on the various external components, a large inventory of adapters must ordinarily be maintained by fabricators or users so that they may readily convert a hose coupling to a desired different fitting configuration.

Conventional hydraulic and pneumatic hose couplings are adapted to sealably mate only with a fitting of a single specific configuration, and fittings of a different design will not usually provide the desired sealing engagement. This lack of interchangeability aggravates the inventory problem since an entire set of adapters must be maintained which have the specific fitting which conforms to the hose coupling, and another complete set must be maintained for each of the other conventional fitting configurations which are employed with the various external components.

In certain installations, it is desirable that the hose coupling be able to swivel so that a coupling at one end of a hose may be tightened without loosening the opposite end. For example, if both ends of a hose mount a rigid, one piece coupling having a right handed nut portion, any rotation of one coupling while tightening the same to an external component would tend to release the previously assembled coupling at the opposite end.

It is accordingly an object of the present invention to provide a hose coupling which is adapted to sealably receive dissimilar externally threaded male fittings so that the required inventory of adapters may be reduced.

It is another object of the present invention to provide a hose coupling which may be readily standardized for all hose sizes to further reduce the required inventory of adapters.

It is a further object of the present invention to provide a universal hose coupling of the described type, and which is adapted to swivel.

These and other objects and advantages of the present invention are achieved in the embodiment illustrated herein by the provision of a hose coupling which comprises a cylindrical stem and a nut sealably and rotatably carried by one end of the stem. A tubular bore extends coaxially through the stem and nut and includes a frusto-conical portion intermediate the ends thereof to define a first outwardly facing sealing surface, and an entry end portion which defines a second outwardly facing sealing surface. A ferrule is positioned about the other end of the stem to secure the end of the hose therebetween. The first sealing surface is adapted to sealably contact a correspondingly tapered forward end of a male fitting, and the second sealing surface is adapted to sealably engage an external O-ring carried by a dissimilar male fitting.

Some of the objects of the invention having been stated, other objects will appear as the description proceeds, when taken in connection with the accompanying drawings, in which FIG. 1 is an elevation view, partly sectioned, of a prior art hose coupling and mating adapter;

Figure 1:
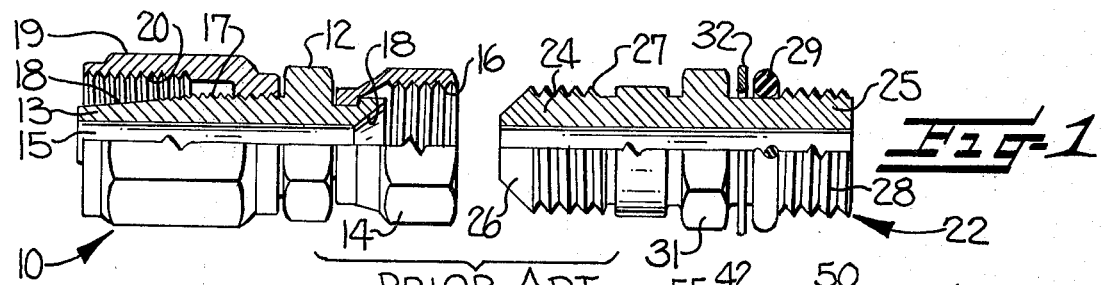

Referring more specifically to the drawings, a standard conventional hose coupling of a type well known in the art is indicated at 10 in FIG. 1. Generally, the hose coupling 10 is adapted to be fixedly connected to one end of a hydraulic or pneumatic hose, and it includes a nipple 12 comprising a cylindrical stem 13 and a "swivel" nut 14 carried at the front end of the stem. A tubular bore 15 extends through the stem and the nut 14 includes an internal thread 16. A portion of the peripheral surface of the stem 13 is threaded at 17, and the entry end of the bore 15 includes a frusto-conical surface 18. A ferrule 19 is threadedly connected to the threads 17 of the stem 13, and it further includes an internal threaded portion 20 for engaging and locking the end of a hose positioned in the annular orifice defined between the ferrule 19 and stem 13.

In order to convert the hose coupling 10 to a desired fitting configuration, it is common to employ an adapter having a fitting at one end designed to sealably engage the coupling, and a fitting at the other end of the desired different configuration. A typical and conventional adapter of this type is illustrated at 22 in FIG. 1. The adapter 22 includes what is known in the art as a "flare" fitting 24 at one end for sealably engaging the coupling 10, and a "straight thread O-ring boss" fitting 25 at the opposite end. The flare fitting 24 includes the conical forward end 26 which conforms to the conical surface 18 of the coupling 10 (generally either 37° or 45° ). Also, the fitting 24 includes an external threaded portion 27 which conforms to the threads in the nut 14 so that the two conical surfaces 18 and 26 may be brought into operative sealing contact by threading the fitting 24 into the nut 14.

The straight thread O-ring boss fitting 25 is commonly used in conjunction with various external components such as valves, pumps, and motors, but it is not designed to be sealably connected to the hose coupling 10. Generally, the fitting 25 includes a threaded end portion 28 which also conforms to the threads in the nut 14, and a resilient O-ring 29 positioned on the boss 30 which lies between the threaded portion 28 and the integral nut portion 31. The fitting 25 may also include a washer 32 positioned intermediate the O-ring 29 and the nut portion 31. As will be apparent, if the fitting 25 were to be threaded into the nut 14, the end of the fitting would engage the conical surface 18 prior to the O-ring 29 being contacted by the end of the nut 14, and in any event, any engagement between the end of the nut 14 and the O-ring 29 would not necessarily result in a sealed relationship.

In accordance with the present invention, a hose coupling is provided which is adapted to sealably receive either the flare fitting 24, or the straight thread O-ring boss fitting 25. Such interchangeability greatly increases the versatility of the coupling since the fabricator or user of such coupling will normally have on hand a large number of fittings of both types. For example, if the fabricator desires to convert from the hose coupling of the present invention to a male pipe fitting, he may employ either an adapter which converts from a flare fitting to a male pipe fitting, or an adapter which converts from a straight thread O-ring boss fitting to a male pipe fitting. This being the case, one of these duplicating adapters may be eliminated from his inventory.

Figure 2:
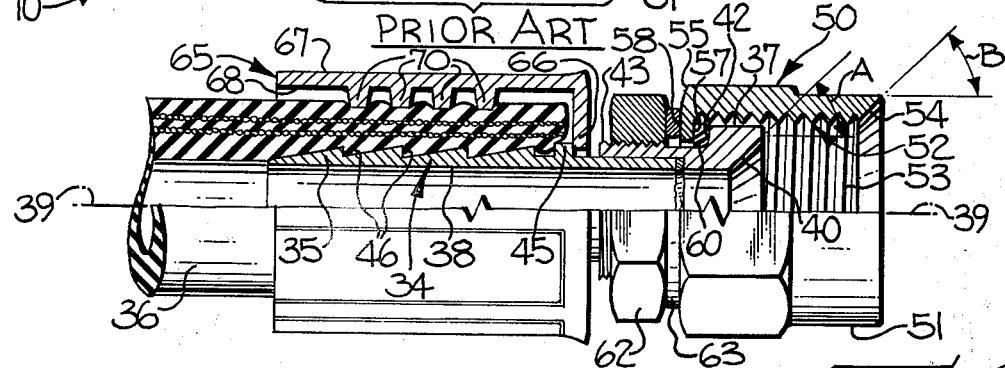
FIG. 2 is an elevation view, partly sectioned, of a hose coupling embodying the features of the present invention.
Figure 3:
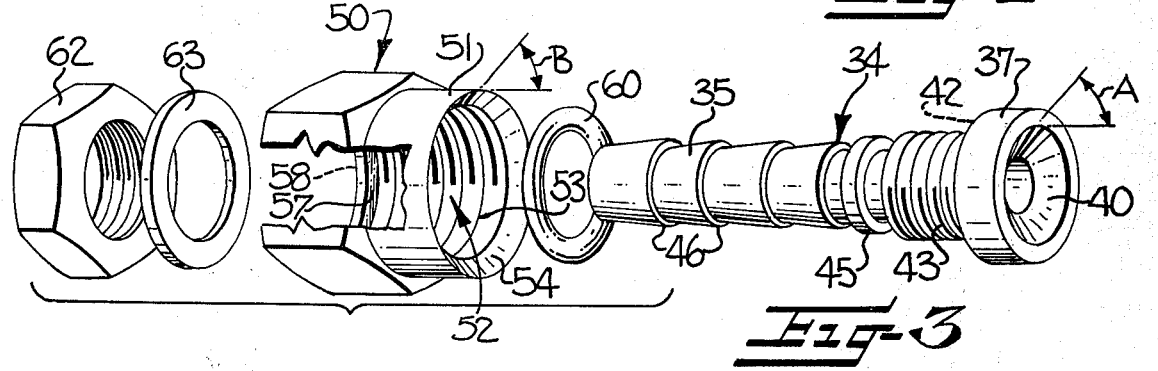
FIG. 3 is an exploded perspective view of the hose coupling shown in FIG. 2.

A hose coupling embodying the present invention is shown in FIG. 2 and comprises a cylindrical stem 34 which includes a rear end portion 35 which is adapted to be inserted into the end of a conventional hose 36, and an integral forward end portion 37. A cylindrical bore 38 extends through the stem to define a central axis 39, and the forward end portion 37 includes a forwardly facing frusto-conical surface 40 communicating with the bore 38. The forward end portion 37 further includes a rearwardly facing external annular shoulder 42 which is disposed coaxially about and perpendicular to the central axis 39, and external threads 43 positioned adjacent the external shoulder. An external annular abutment 45 is mounted at a medial location on the stem 34, and a plurality of external locking shoulders 46 are positioned on the rear end portion 35 for the purpose of retaining the hose 36 as hereinafter further described.

A nut 50 is sealably and rotatably carried by the stem 34 to permit swiveling, i.e., relative rotation about the central axis between the stem and nut. The nut 50 comprises a forward end portion 51 having an internal bore 52 which is larger in diameter than the diameter of the bore 38 and somewhat larger than the outer diameter of the forward end portion 37 of the stem, note FIG. 2. The bore 52 includes internal threads 53, and an entry end portion in the form of a forwardly facing frusto-conical surface 54 which communicates with the threads 53 of the bore. The rear end portion 55 of the nut 50 includes a radial flange which defines a forwardly facing internal annular shoulder 57 disposed parallel to and opposing the external shoulder 42 of the stem, and a rearwardly facing shoulder 58.

The forwardly facing frusto-conical surface 40 will be seen to be positioned between the bore 38 of the stem and the bore 52 of the nut the thereby define a first outwardly facing sealing surface. Also, the frusto-conical entry end surface 54 of the nut 50 defines a second outwardly facing sealing surface. Since the standard flare fitting has a conical forward end angled at either 37° or 45°, the angle A of the frusto-conical surface 40 will preferably conform to one of these standard values. Also, the angle B of the frusto-conical entry end surface 54 will typically be about 45°.

As will be apparent from the drawings, the frusto-conical surface 40 has an axial depth equal to at least about one half the diameter of the bore 38 such that a relatively broad sealing surface is presented for engagement by the conical surface 26 of the flare fitting 24. Also, the frusto-conical entry end surface 54 of the nut has an axial depth and maximum diameter sufficient to permit the O-ring 29 of the fitting 25 to be substantially received therewithin.

In the illustrated embodiment, a resilient sealing O-ring 60 is operatively disposed intermediate the external shoulder 42 and internal shoulder 57, and a locking nut 62 is carried by the threads 43 for maintaining a firm pressure across the O-ring 60 and between the shoulders 42 and 57. By this arrangement, the nut 50 may be swiveled or rotated about the axis 39 relative to the stem 34 while the O-ring 60 maintains a seal therebetween. Also, the nut 50 and locking nut 62 may include a hexagonal peripheral surface in cross section to facilitate engagement by a conventional wrench, and a washer 63 may, if desired, be interposed between the locking nut 62 and shoulder 58 of the nut to facilitate the swiveling of the nut.

The illustrated hose coupling further comprises means for securing an end of the hose 36 to the rear end portion 35 of the stem 34. This securing means comprises the external abutment 45 and locking shoulders 46 noted above, and further comprises a tubular ferrule 65 positioned coaxially about the rear end portion 35 of the stem. The ferrule 65 includes a radial flange 66 at the forward end thereof for locking the same behind the abutment 45, and a main body portion 67 which overlies in spaced relation the outer periphery of the rear end portion 35 of the stem to define an annular orifice 68 therebetween for receiving the end of the hose 36. Also, the interior of the ferrule 65 includes a number of unitary locking rings 70 designed to bite into and deform the cover of the hose 36 to thereby maintain the hose 36 within the annular orifice 68.

To assemble the hose coupling to the hose 36, the ferrule 65 is initially positioned to overlie the end of the hose, and the rear end portion 35 of the stem 34 is then inserted into the end of the hose. The ferrule 65 is then crimped or reduced in diameter by means of a suitable power crimping machine or the like to result in the flange 66 being moved radially inwardly and behind the abutment 45 to thereby preclude relative axial movement between the ferrule and stem. Also, the locking rings 70 will move inwardly to bite into the cover of the hose to lock the same within the annular orifice 68.

Figure 4:
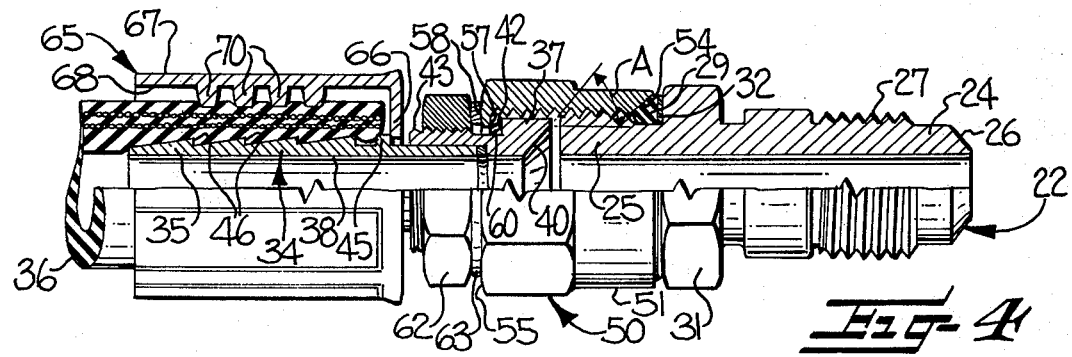
FIG. 4 is a view similar to FIG. 2 and showing the hose coupling sealably receiving the male fitting at one end of the adapter shown in FIG. 1.

FIG. 4 illustrates the hose coupling of the present invention sealably receiving the straight thread O-ring boss fitting 25 of the adapter 22. In particular, it will be seen that the frusto-conical entry end surface 54 of the nut 50 is positioned to provide a relatively broad engagement surface with the O-ring 29, while compressing the same to effect the seal between the surface 54 and boss 30. Concurrently, the O-ring 60 acts to maintain a seal between the nut 50 and stem 34 while permitting the nut 50 to swivel with respect to the stem 34 and hose 36.

Figure 5:
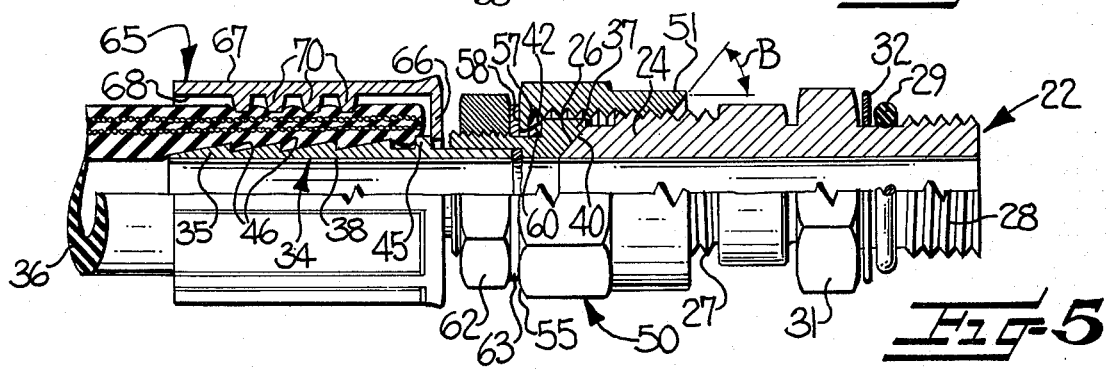
FIG. 5 is a view similar to FIG. 4 but showing the hose coupling sealably receiving the male fitting at the opposite end of the adapter shown in FIG. 1.

FIG. 5 shows the hose coupling of the present invention sealably receiving a flare fitting 24. In this case, the conical end surface 26 of the fitting 24 is in sealing contact with the relatively broad frusto-conical surface 40 of the stem.

As will be apparent from the drawings, the stem 34 of the illustrated embodiment is fabricated from two components which are fixedly interconnected by any suitable method, such as brazing or soldering. Alternatively, the stem 34 could be fabricated from a unitary stock piece by employing conventional machining operations. Also, it will be apparent that the illustrated ferrule 65 of the present invention could take the form of the ferrule 19 in FIG. 1 and wherein there is a threaded interconnection between the ferrule and the stem.

In the drawings and specification, there has been set forth a preferred embodiment of the invention, and although specific terms are employed, they are used in a generic and descriptive sense only and not for purposes of limitation.

That which is claimed is:

1. A hose coupling adapted to be fixedly connected to one end of a hydraulic hose or the like and characterized by the ability to swivel and sealably receive dissimilar externally threaded male fittings for connecting the coupling and associated hose to various external components, said hose coupling comprising
    a cylindrical stem defining a central axis and having one end adapted to be inserted into the end of a hose, and an opposite end,
    a nut,
    means for sealably and rotatably mounting said nut to said opposite end of said stem to thereby permit relative rotation between said stem and nut about said central axis, and including
        a first annular shoulder positioned on said stem adjacent said opposite end thereof and being disposed coaxially about and transverse to said central axis,
        a second annular shoulder positioned on said nut and being disposed parallel to and facing said first shoulder,
        means for maintaining a firm pressure between said first and second shoulders while permitting relative rotation about said central axis, and
        sealing means operatively disposed between said stem and nut,
    a tubular bore extending along said central axis and through said stem and nut, said tubular bore including
        a first portion extending substantially through said stem,
        a second internally threaded portion of a diameter larger than said first portion and extending for at least a substantial portion of the distance through said nut,
        a frusto-conical portion positioned between said first portion and said second portion to define a first outwardly facing sealing surface, and
        an entry end portion communicating with said second portion and defining a second outwardly facing sealing surface, and
    means for securing an end of the hose coaxially to said one end of said stem, whereby either an externally threaded male fitting having a conically tapered forward end conforming to the taper of said first sealing surface, or an externally threaded male fitting having an external O-ring which is adapted to sealably engage said second sealing surface, may be sealably received in said coupling.

2. The hose coupling as defined in claim 1 wherein said means for maintaining a firm pressure between said first and second shoulders comprises external threads positioned on said stem, and a locking nut operatively engaging said external threads.

3. The hose coupling as defined in claim 1 wherein said securing means comprises a tubular ferrule positioned coaxially about said cylindrical stem and defining an annular orifice between said stem and ferrule for receiving the end of the hose, and means for locking the hose in said annular orifice.

4. The hose coupling as defined in claim 3 wherein said securing means further comprises means for preventing relative axial movement between said ferrule and said stem.

5. The hose coupling as defined in claim 1 wherein said frusto-conical portion of said tubular bore is inclined at an angle of between about 37° and 45° from said central axis.

6. The hose coupling as defined in claim 5 wherein said frusto-conical portion of said tubular bore has an axial depth equal to at least about one half the diameter of said first portion of said tubular bore such that the first sealing surface is relatively broad.

7. The hose coupling as defined in claim 6 wherein said second outwardly facing sealing surface is frusto-conical.

8. The hose coupling as defined in claim 7 wherein said second outwardly facing sealing surface has an axial depth and maximum diameter sufficient to permit an external O-ring on a mating male fitting to be substantially received therewithin.

9. The hose coupling as defined in claim 1 wherein said nut includes a peripheral surface defining a hexagon in cross section and which is adapted to be engaged by a conventional wrench. coefficient 10. A hose coupling adapted to be fixedly connected to one end of a hydraulic hose or the like and characterized by the ability to swivel and sealably receive dissimilar externally threaded male fittings for connecting the coupling and associated hose to various external components, said hose coupling comprising
    a cylindrical stem comprising
        a. a bore extending through said stem and defining a central axis,
        b. a rear end portion adapted to be inserted into the end of a hose, and
        c. a forward end portion including a forwardly facing frusto-conical sealing surface communicating with said bore and an external annular shoulder being disposed coaxially about and substantially perpendicular to said central axis,
    a nut sealably and rotatably carried by said stem and comprising
        a. a forward end portion having an internal diameter larger than that of said bore of said stem, and including internal threads, and a forwardly facing sealing surface at the forward end thereof communicating with said internal threads, and
        b. a rear end portion including an internal annular shoulder being disposed parallel to and opposing said external shoulder of said stem,
    sealing means operatively carried between said forward end portion of said stem and rear end portion of said nut, and
    locking means for maintaining a firm pressure between said shoulders, to thereby maintain the assembly of the stem and nut while permitting relative rotation therebetween, whereby either an externally threaded male fitting having a conically tapered forward end conforming to the taper of said frusto-conical sealing surface, or an externally threaded male fitting having an external O-ring which is adapted to sealably engage said forwardly facing sealing surface on said nut, may be sealably received in said coupling.

11. The hose coupling as defined in claim 10 wherein said locking means comprises external threads carried by said stem adjacent said external annular shoulder, a third annular shoulder carried by said nut and disposed parallel to but facing opposite from said internal annular shoulder, and a threaded member encircling said stem and carried by said external threads and adapted to engage said third annular shoulder to thereby maintain a firm pressure between said internal annular shoulder of said nut and said external annular shoulder of said stem.

12. The hose coupling as defined in claim 11 wherein said sealing means comprises a sealing O-ring operatively disposed between said external and internal shoulders.

13. The hose coupling as defined in claim 12 wherein said locking means further comprises a washer positioned about said stem and between said threaded member and third shoulder to facilitate relative rotation between said stem and nut.

* * * * *